United States Patent
Aiba et al.

(10) Patent No.: US 10,004,132 B2
(45) Date of Patent: Jun. 19, 2018

(54) DOSE RATE MONITORING DEVICE

(71) Applicant: Mitsubishi Electric Corporation, Chiyoda-ku, Tokyo (JP)

(72) Inventors: Toshihide Aiba, Tokyo (JP); Kenichi Moteki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/505,548

(22) PCT Filed: Oct. 23, 2014

(86) PCT No.: PCT/JP2014/078169
§ 371 (c)(1),
(2) Date: Feb. 21, 2017

(87) PCT Pub. No.: WO2016/063391
PCT Pub. Date: Apr. 28, 2016

(65) Prior Publication Data
US 2017/0280542 A1 Sep. 28, 2017

(51) Int. Cl.
*G01T 1/02* (2006.01)
*H05G 1/44* (2006.01)
*G01T 1/17* (2006.01)

(52) U.S. Cl.
CPC ............... *H05G 1/44* (2013.01); *G01T 1/17* (2013.01); *G01T 1/023* (2013.01); *G01T 1/026* (2013.01)

(58) Field of Classification Search
CPC .................................... G01T 1/17; G01T 1/40
See application file for complete search history.

(56) References Cited

U.S. PATENT DOCUMENTS

| | | | | |
|---|---|---|---|---|
| 4,527,063 A | * | 7/1985 | Kronenberg | G01T 1/17 250/370.06 |
| 4,862,004 A | * | 8/1989 | Koike | G01T 1/40 250/252.1 |

(Continued)

FOREIGN PATENT DOCUMENTS

| | | |
|---|---|---|
| JP | S62-158375 U | 10/1987 |
| JP | 01250885 | 10/1989 |

(Continued)

OTHER PUBLICATIONS

International Search Report (PCT/ISA/210) dated Dec. 22, 2014, by the Japanese Patent Office as the International Searching Authority for International Application No. PCT/JP2014/078169.

(Continued)

*Primary Examiner* — Kiho Kim
(74) *Attorney, Agent, or Firm* — Buchanan Ingersoll & Rooney PC (57) ABSTRACT

A dose rate monitoring device includes: a first energy compensation coefficient operation part obtaining a first energy compensation coefficient to incident radiation using the first compensation coefficient table, a first dose rate operation part obtaining a first compensation dose rate of incident radiation using the first energy compensation coefficient and G (E) function, a second energy compensation coefficient operation part obtaining a second energy compensation coefficient to incident radiation using a second compensation coefficient table, a second dose rate operation part obtaining a second compensation dose rate of incident radiation using a second energy compensation coefficient, a dose rate switching section which select an output according to the magnitude of a ratio of the first compensation dose rate to the second compensation dose rate, and a display operating section which displays the first compensation dose (Continued)

rate or the second compensation dose rate which the dose rate switching section outputs.

9 Claims, 8 Drawing Sheets

(56) References Cited

U.S. PATENT DOCUMENTS

| | | | | |
|---|---|---|---|---|
| 5,262,947 | A | * 11/1993 | Boudan | ............... G01T 1/17 |
| | | | | 250/366 |
| 2015/0153461 | A1 | * 6/2015 | Aoki | ............... G01T 1/244 |
| | | | | 250/370.07 |

FOREIGN PATENT DOCUMENTS

| | | |
|---|---|---|
| JP | 3-239986 B2 | 10/1991 |
| JP | 2002-022839 A | 1/2002 |
| JP | 2002-168957 A | 6/2002 |
| JP | 2004-108796 A | 4/2004 |
| JP | 2005-249580 A | 9/2005 |
| JP | 2012-007899 A | 1/2012 |
| JP | 2014-145638 A | 8/2014 |

OTHER PUBLICATIONS

Written Opinion (PCT/ISA/237) dated Dec. 22, 2014, by the Japanese Patent Office as the International Searching Authority for International Application No. PCT/JP2014/078169.

* cited by examiner

FIG. 2

Low Range Compensation Coefficient Table

| Moving Average Wave Height Value h1 | Energy Compensation Coefficient $\beta 1$ |
|---|---|
| $h1(-j)$ | $\beta 1(-j)$ |
| $h1(-j+1)$ | $\beta 1(-j+1)$ |
| ⋮ | ⋮ |
| $h1(0)=h1_s$ | $\beta 1(0)=\beta 1_s=1$ |
| ⋮ | ⋮ |
| $h1(i-1)$ | $\beta 1(i-1)$ |
| $h1(i)$ | $\beta 1(i)$ |

Corresponding to Cs-137

FIG. 3

High Range Compensation Coefficient Table

| Moving Average Wave Height Value h2 | Energy Compensation Coefficient $\beta 2$ |
|---|---|
| $h2(-j)$ | $\beta 2(-j)$ |
| $h2(-j+1)$ | $\beta 2(-j+1)$ |
| ⋮ | ⋮ |
| $h2(0)=h2_s$ | $\beta 2(0)=\beta 2_s=1$ |
| ⋮ | ⋮ |
| $h2(i-1)$ | $\beta 2(i-1)$ |
| $h2(i)$ | $\beta 2(i)$ |

Corresponding to Cs-137

DOSE RATE MONITORING DEVICE

FIELD OF THE INVENTION

This present invention relates to dose rate monitoring devices, and more particularly relates to a dose rate monitoring device which is wide in the range of dose rate measurements.

BACKGROUND OF THE INVENTION

At the periphery of a nuclear power plant, spent nuclear fuel reprocessing facilities, and the like, installed are dose rate monitoring devices which can provide a wide range of dose rate measurements (refer to Patent Documents 1-6, for example). The dose rate measurements, ranging from a naturally occurring radiation level during a peace time, to a high radiation level at the time of an accident, are usually covered by installing two dose rate monitoring devices side by side, each of which is equipped with a radiation detector of a different kind. In this configuration, one of the dose rate monitoring devices which are installed side by side, may become an obstacle to the other dose rate monitoring device, with respect to the incoming radioactive rays from the space around. Thereby, measurement outcomes are affected by the side by side installation of the dose rate monitoring devices in no small part. It has been desired to provide a dose rate monitoring device which enables measurements ready for a wide range of the dose rate in a single body, also from the viewpoints of the down-sizing, cost reduction, and space saving of the entire monitoring device.

In the dose rate monitoring devices according to Patent Document 1 and Patent Document 2, a detector for a low range and a detector for a high range are arranged in a single detecting element section of the monitoring device, as a tactic way for solving these issues. The detector for the low range and the detector for the high range employ a scintillation detector and a semiconductor detector, respectively. The measurement range of the detectors is switched to output the measurement outcomes. In both Patent Documents, a NaI (Tl) scintillation detector which uses a thallium activation sodium iodide scintillator has been employed as a detector for the low range.

When a dose rate monitoring device employs a different radiation detector, the dose rate monitoring device will show different energy characteristics. Accordingly, a level difference arises in the reading of the dose rate monitoring device, when switching between the low range and the high range is performed for outputting the dose rate. The dose rate monitoring device according to Patent Document 1 measures the wave height spectrum of a detector output pulse received from at least one of the detectors, and estimates the energy of an incident radioactive ray, in order to reduce the level difference raised by this range switching. In the upper and lower dose rate fields including a switching point, a level difference of great size which arises at the switching point has been cancelled by uniting one of the energy characteristics at the dose rate fields with the other energy characteristic.

The sensitivity of radiation detectors is dependent on the incident direction of a radioactive ray. In the dose rate monitoring device according to Patent Document 2, a single semiconductor detector is provided on the head side of the cylindrical scintillator of a scintillation detector, and further two semiconductor detectors are provided on the side planes of the cylindrical scintillator, with 180 degrees apart in a circle. By employing the configuration of the semiconductor detectors mentioned above, the level difference due to the direction dependence of a detector for the low range and a detector for the high range has been reduced at the time of the range switching.

CITATION LIST

Patent Literature

Patent Document 1: JP 2002-022839 A
Patent Document 2: JP 2002-168957 A
Patent Document 3: JP S62-158375 U
Patent Document 4: JP H01-250885 A
Patent Document 5: JP 2004-108796 A
Patent Document 6: JP 2005-249580 A

SUMMARY OF THE INVENTION

Technical Problem

Even though the dose rate monitoring device according to Patent Document 1 is capable of reducing the level difference at the switching point, energy characteristics (linearity) of overall ranges, which include the range for a low range dose rate and the range for a high range dose rate, are not fully improved. Further, in the dose rate monitoring device according to Patent Document 2, all of the semiconductor detectors stand on a shadowing area to the scintillator (a radioactive ray sensor) of a scintillation detector. Accordingly, outcomes in the measurement are affected by the configuration of the detectors.

The present invention has been made in order to solve the above mentioned subjects. In other words, the invention aims at flattening the both energy characteristics at the low range dose rate and high range dose rate, and as a result, improving the energy characteristics (linearity) of the whole range, and further providing the dose rate monitoring device which is capable of wide range and highly precise measurements.

Solution to Problem

A dose rate monitoring device according to the present invention comprises: a radiation detector outputting an analog voltage pulse upon absorption of an incident radioactive ray; a first pulse amplifier amplifying the analog voltage pulse which the radiation detector outputs; a first analog to digital conversion part converting an output of the first pulse amplifier into a digital signal; a first wave height spectrum generation part generating a wave height spectrum of the incident radioactive ray from the output of the first analog to digital conversion part; a first energy compensation coefficient operation part obtaining a first energy compensation coefficient to the incident radioactive ray using a first compensation coefficient table which shows a relation between an average wave height value and an energy compensation coefficient, when the wave height spectrum which the first wave height spectrum generation part generated is received; a first dose rate operation part obtaining a first dose rate of the incident radioactive ray using a G (E) function table, when the wave height spectrum which the first wave height spectrum generation part generated is received, and further calculating a first compensation dose rate of the incident radioactive ray using the obtained first dose rate and the first energy compensation coefficient; a radiation detection unit outputting an analog voltage pulse upon absorption of an incident radioactive ray; a second pulse amplifier amplifying the analog voltage pulse which the radiation detection unit outputs; a second analog to digital conversion part converting an output of the second pulse amplifier into a digital signal; a second wave height spectrum generation part generating a wave height spectrum of the incident radioactive ray from an output of the second analog to digital conversion part; a second energy compensation coefficient operation part obtaining a second energy compensation coefficient to the incident radioactive ray using a second compensation coefficient table which shows a relation between an average wave height value and an energy compensation coefficient, when the wave height spectrum which the second wave height spectrum generation part generated is received; a second dose rate operation part obtaining a second dose rate of the incident radioactive ray when the wave height spectrum which the second wave height spectrum generation part generated is received, and further calculating a second compensation dose rate of the incident radioactive ray using the obtained second dose rate and the second energy compensation coefficient; a dose rate switching section calculating a ratio of the first compensation dose rate which the first dose rate operation part obtained to the second compensation dose rate which the second dose rate operation part obtained, and further outputting the first compensation dose rate or the second compensation dose rate according to the magnitude of the calculated ratio; and a display operating section displaying the first compensation dose rate or the second compensation dose rate which the dose rate switching section outputs.

Advantageous Effects of Invention

According to the dose rate monitoring device of the present invention, the wave height spectrum is obtained from the average wave height value of an incident radioactive ray, at each of the wave height spectrum generation part. The distortion of the energy characteristics is compensated and the energy characteristics become flat, by using the correlation between an average wave height value and an average energy of an incident radioactive ray. Range switching is made to output the dose rate on which the energy compensation is carried out. As a result, the level difference accompanied by the dose rate switching can be reduced, and further, it is possible to provide a dose rate monitoring device which is good at accuracy of the measurement over the whole dose rate range.

DESCRIPTION OF EMBODIMENTS

Hereinafter, embodiments of the radiation monitoring device according to the present invention will be explained in detail with reference to the accompanying drawings. It should be noted that the present invention is not limited to the following descriptions but can appropriately be modified within a scope that does not deviate from its spirits.

Embodiment 1

Figure 1:
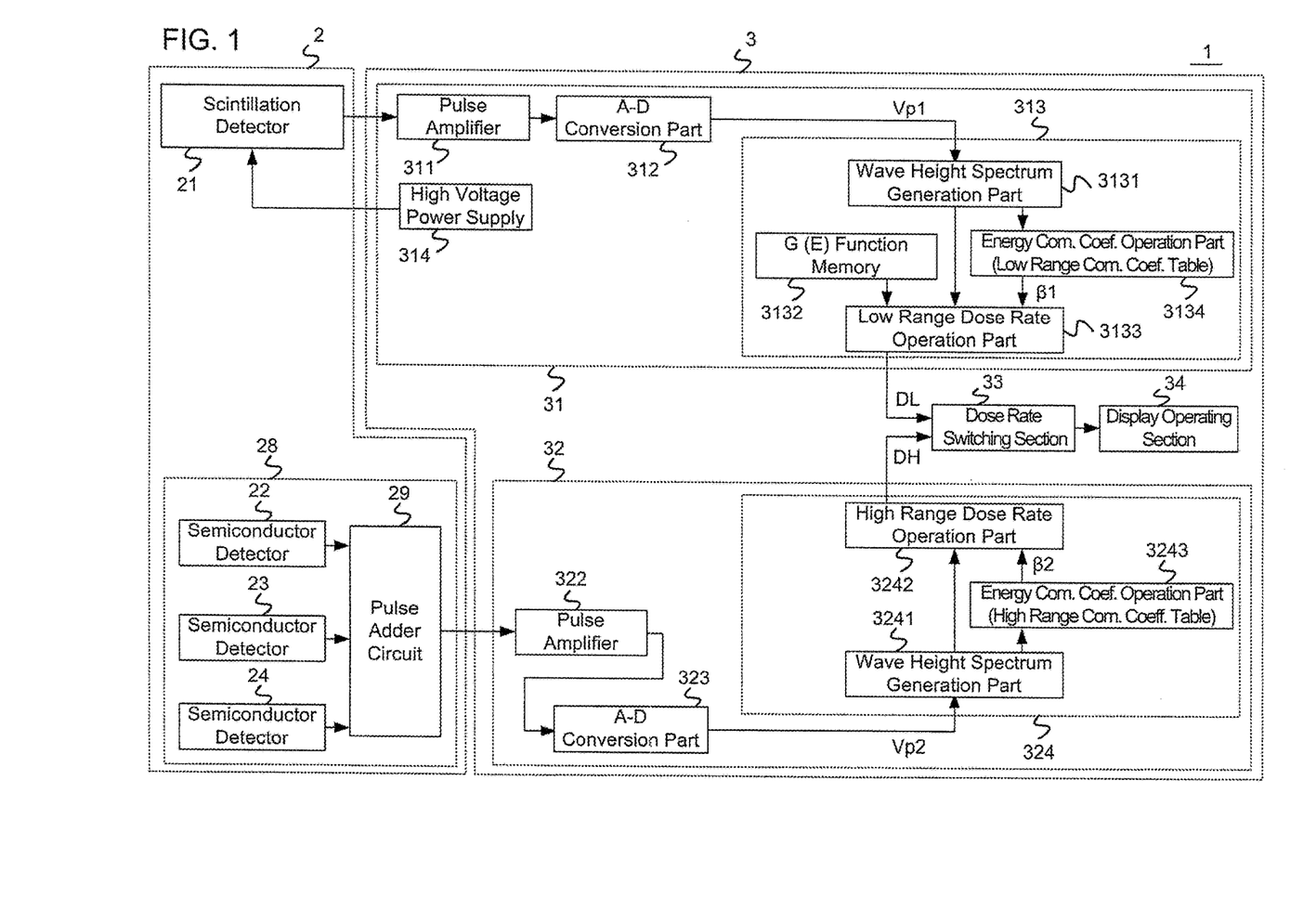
FIG. 1 is a drawing for showing the configuration of a dose rate monitoring device in accordance with Embodiment 1.

FIG. 1 is a drawing for showing the configuration of a dose rate monitoring device in accordance with Embodiment 1. As shown in the figure, the dose rate monitoring device 1 comprises a detecting element section 2 and a measurement section 3. The detecting element section 2 consists of a scintillation detector 21 and a radiation detection unit 28. In a low dose rate area, the scintillation detector 21 (a radiation detector) absorbs the energy of radioactive rays which are incident thereon, and outputs the discrete analog voltage pulse (a first detection signal pulse) of a wave height value, which is proportional to the absorbed energy. The radiation detection unit 28 is provided with semiconductor detectors 22-24 and a pulse adder circuit 29. In a high dose rate area, the semiconductor detector 22, the semiconductor detector 23, and the semiconductor detector 24 absorb the energy of incident radioactive rays, and output the discrete analog voltage pulse (a second detection signal pulse) of a wave height value, which is proportional to the absorbed energy. The pulse adder circuit 29 receives the second detection signal pulses outputted from the semiconductor detectors 22-24, integrates three trains of pulses into one train of pulses, and outputs an analog voltage pulse (a third detection signal pulse).

Instead of the scintillation detector 21, radiation detectors, like a proportional counter tube, the Geiger Muller tube (GM tube) and others, can be utilized. In the radiation detection unit 28 where a singular or two or more radiation detectors are provided, an ion chamber can be applied, instead of the semiconductor detectors 22-24. The measurement section 3 is provided with a low range dose rate measurement part 31 which corresponds to the scintillation detector 21, and a high range dose rate measurement part 32 which corresponds to the semiconductor detectors 22-24. The low range dose rate measurement part 31 (a first dose rate measuring means) calculates a low range compensation dose rate DL (a first compensation dose rate) based on the wave height value of the analog voltage pulse outputted from the scintillation detector 21, and outputs it to the dose rate switching section 33. The high range dose rate measurement part 32 (a second dose rate measuring means) calculates a high range compensation dose rate DH (a second compensation dose rate) based on the counting rate of the analog voltage pulse outputted from the semiconductor detectors 22-24, and outputs it to the dose rate switching section 33.

The scintillation detector 21 utilizes a NaI (Tl) scintillation detector, for example, which is equipped with a cylindrical NaI (Tl) scintillator. The NaI (Tl) scintillation detector is offered commercially and is easily available for use. In a similar way, other detectors, like an inorganic scintillation detector and a plastic scintillation detector, can also be applied to the scintillation detector 21. The linearity of a scintillation detector 21 will decrease in the measurement range, if the dose rate becomes high, due to the fact that the probability of the occurrence in the pileup of first detection signal pulses, which the detector output, becomes too large to ignore. In an analogous way, the linearity will fall, if the dose rate becomes high, also in the semiconductor detectors 22-24. Thereby, a semiconductor detector will be chosen among detectors which are in a suitable sensitivity, so that the upper range of the semiconductor detector may become 4.5 decades or more larger than the upper range of the scintillation detector 21.

The sensitivity of the semiconductor detectors 22-24 is in inverse proportion to their noticeable areas. If the sensitivity of a semiconductor detector is too low, second detection signal pulses, which are outputted in the vicinity of a lower limit range, will become too low in the repetition frequency. Accordingly, the dose rate will become worse in the resolution, and fluctuations of the dose rate will become large suddenly at the time of the switching from a low range compensation dose rate DL to a high range compensation dose rate DH. In order to lower the sudden change of the fluctuations, it is preferable to select a scintillation detector 21 which is in conformity with the scintillator size and semiconductor detectors 22-24 which are in conformity with the noticeable sensor area, according to the range which each of the detectors is assigned to.

In the measurement section 3, the low range dose rate measurement part 31 receives a first detection signal pulse (an analog voltage pulse) from the scintillation detector 21, and measures a first wave height spectrum of the first detection signal pulse. Each wave height value of the first wave height spectra is weighted by a dose rate (nGy-h-1/cpm), and the dose rate is multiplied by a countable number corresponding to each wave height value. The values of the calculated results are integrated in the energy range of the measurement, and divided by a measuring time (corresponding to an integration time), to obtain a low range dose rate D1 (a first dose rate) of an incident radioactive ray. Energy compensation is carried out on this low range dose rate D1 by an energy compensation coefficient ß1 (a first energy compensation coefficient; refer to FIG. 2) to find a low range compensation dose rate DL (a first compensation dose rate). The low range compensation dose rate DL is outputted to the dose rate switching section 33.

A high range dose rate measurement part 32 receives second detection signal pulses from the semiconductor detectors 22-24, and arranges each of the second detection signal pulses in chronological order. Each of the second detection signal pulses are added, and the high range dose rate measurement part 32 measures a second wave height spectrum of these added second detection signal pulses. Countable numbers corresponding to each wave height value of the second wave height spectrum are integrated in the energy range of measurements, and the integrated value is divided by a measuring time (corresponding to an integration time) to obtain a counting rate. The counting rate is multiplied with a correction constant (the ratio of a dose rate to the unit counting rate), to obtain a high range dose rate D2 (a second dose rate). Energy compensation of the high range dose rate D2 is carried out by an energy compensation coefficient ß2 (a second energy compensation coefficient; refer to FIG. 3) to obtain a high range compensation dose rate DH. The high range compensation dose rate DH (a second compensation dose rate) is outputted to a dose rate switching section 33.

In the measurement section 3, the dose rate switching section 33 switches a display range from a low range compensation dose rate DL to a high range compensation dose rate DH, at a predetermined switching point of increase time, when dose rates are at a increasing tide. Similarly, the dose rate switching section 33 switches the display range from the high range compensation dose rate DH to the low range compensation dose rate DL, at a predetermined switching point of decrease time, when dose rates are at a decreasing tide. In order to prevent hunching at the range switching points, hysteresis is provided in the display range. As for the switching points, the equation is satisfied that the switching point of increase time>the switching point of decrease time. The display operating section 34 displays on a screen the dose rate (a high range compensation dose rate DH or a low range compensation dose rate DL) outputted from the dose rate switching section 33, and further receives setups of the measurement section through a touch panel.

Next, the low range dose rate measurement part 31 and the high range dose rate measurement part 32 will be explained to the detail of the configuration and the operation thereof. The low range dose rate measurement part 31 is provided with a pulse amplifier 311, an analog to digital conversion part 312 (A-D conversion part), a low range operation part 313, and a high voltage power supply 314. The high voltage power supply 314 is connected to a scintillation detector 21. The low range operation part 313 is provided with a wave height spectrum generation part 3131, a G (E) function memory 3132, a low range dose rate operation part 3133, and an energy compensation coefficient operation part 3134 (a first energy compensation coefficient operation part). The pulse amplifier 311 (a first pulse amplifier) receives a first detection signal pulse (analog voltage pulse) outputted from the scintillation detector 21 and amplifies it, and further, removes high frequency noises which are superimposed on the signal pulses. The analog to digital conversion part 312 (a first analog to digital conversion part) converts the first detection signal pulse amplified with the pulse amplifier 311 into a digital signal, and measures a wave height value Vp1 of the digital signal.

In the low range operation part 313, the wave height spectrum generation part 3131 (a first wave height spectrum generation part) receives a wave height value Vp1 outputted from the analog to digital conversion part 312, and generates and outputs a wave height spectrum (a first wave height spectrum). The spectrum data (a first wave height spectrum) from the wave height spectrum generation part 3131 is sent to the low range dose rate operation part 3133 (a first dose rate operation part). The G (E) function memory 3132 is in memory of a G (E) function table, where each ch (i) equivalent to the wave height and a dose rate Gi (nGy-h-1/cpm) are arranged on a one-to-one basis, in order to use the method of spectrum-dose conversion operator. The method of spectrum-dose conversion operator has been also referred to as the G (E) function method, and was developed in Japan Atomic Energy Research Institute in the 1960s. For example, in the G (E) function table, a measurement energy range of 50-3000 keV is divided into 10-600 channels (ch). The low range dose rate operation part 3133 integrates the product of a dose rate Gi and a countable value Ni at each ch (i) of every operation cycle, using this G (E) function table. The integrated value, $\Sigma$ Gi×Ni, calculated on 10-600 chs for a constant cycle, is divided by a constant periodic time, to be referred to as a dose rate of the operation cycle time concerned. When moving average of the most updated data row is carried out for a measuring time, a low range dose rate D1 (a first dose rate) will be obtained.

The energy compensation coefficient operation part 3134 receives the spectrum data (a first wave height spectrum) from the wave height spectrum generation part 3131, and integrates the product of a wave height value Hi and a countable value Ni at each ch (i), which were measured for 10-600 chs at a constant cycle. The integrated wave height value, Σ Hi×Ni, is divided by the integrated countable value Σ Ni, and the dividend is referred to as an average wave height value of the operation cycle time concerned. The energy compensation coefficient operation part 3134 takes in the average wave height values, and carries out moving average of the most updated data row of the average wave height values for the measuring time, to obtain a moving average wave height value h1. The energy of radioactive rays which enter into the scintillation detector 21 is in correlation with the moving average wave height value h1, in that the latter also goes up with the rise of the former.

Figure 2:
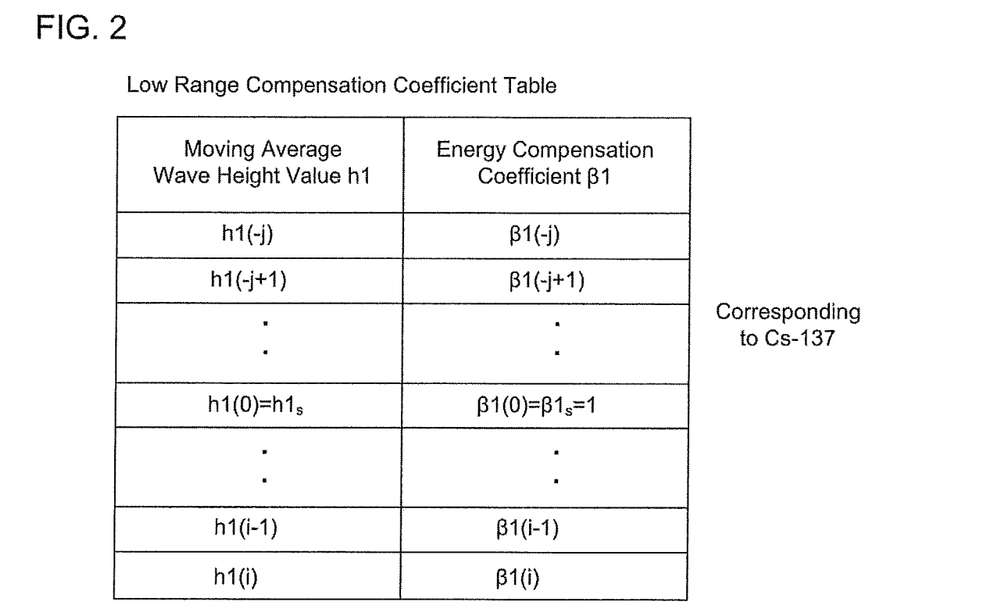
FIG. 2 is a drawing for showing a compensation coefficient table in relation to a low range dose rate.

FIG. 2 is a low range compensation coefficient table (a first compensation coefficient table) for showing the relation between the average wave height value (especially, a moving average wave height value h1) of incident radioactive rays, and the energy compensation coefficient ß1 (a first energy compensation coefficient). The low range compensation coefficient table is in memory of the energy compensation coefficient operation part 3134. The energy compensation coefficient operation part 3134 compares a moving average wave height value h1 with the low range compensation coefficient table, determines an energy compensation coefficient ß1, and outputs it to a low range dose rate operation part 3133. The low range dose rate operation part 3133 outputs a low range compensation dose rate DL, which is obtained by multiplying the energy compensation coefficient ß1 with the low range dose rate D1. In the low range compensation coefficient table, a standard energy is defined as γ ray 662 keV of Cs-137, for example. The energy compensation coefficient ß1 corresponding to the standard energy is set at 1, and energy compensation coefficients ß1 of other energy levels are shown as the ratio of the standard energy.

The high range dose rate measurement part 32 consists of a pulse amplifier 322, an analog to digital conversion part 323 (A-D conversion part), and a high range operation part 324. The high range operation part 324 is provided with a wave height spectrum generation part 3241 (a second wave height spectrum generation part), a high range dose rate operation part 3242 (a second dose rate operation part), and an energy compensation coefficient operation part (a second energy compensation coefficient operation part) 3243. Detection signal pulses outputted from the semiconductor detectors 22-24 are inputted into the pulse adder circuit 29, and three trains of the pulse are integrated into one train of the pulse at the pulse adder circuit. The pulse amplifier 322 (a second pulse amplifier) receives and amplifies the analog voltage pulse (a third detection signal pulse) which is integrated in the pulse adder circuit 29, and furthermore removes high frequency noises which are superimposed on the analog voltage pulse. The analog to digital conversion part 323 (a second analog to digital conversion part) converts a second detection signal pulse amplified with the pulse amplifier 322 into a digital signal, and measures the wave height value Vp2 of the digital signal.

In the high range operation part 324, the wave height spectrum generation part 3241 receives a wave height value Vp2 which is outputted from the analog to digital conversion part 323, and generates and outputs a wave height spectrum (a second wave height spectrum). The high range dose rate operation part 3242 receives spectrum data (a second wave height spectrum) from the wave height spectrum generation part 3241, and integrates a countable value Mi of each ch (i), which were measured for 10-600 chs at a constant cycle. The integrated countable value, Σ Mi, is divided by a constant periodic time, and a counting rate is obtained for the operation cycle time concerned. Furthermore, moving average of the most updated data row of the counting rates, which are included in a measuring time, is carried to obtain a moving average counting rate. A correction constant is multiplied to the moving average counting rate, and a high range dose rate D2 (a second dose rate) is obtained.

The energy compensation coefficient operation part 3243 receives spectrum data from the wave height spectrum generation part 3241, and integrates the product of a wave height value Hi and a countable value Mi of each ch (i), which were measured for 10-600 chs at a constant cycle. The integrated wave height value, ΣHi×Mi, is divided by an integrated countable value, Σ Mi, and the dividend is referred to as an average wave height value of the operation cycle time concerned. When the energy compensation coefficient operation part 3243 takes in the average wave height values, and carries out moving average of the most updated data row of the average wave height values for a measuring time, a moving average wave height value h2 will be calculated. The energy of radioactive rays, which enter into the semiconductor detectors 22-24, is in correlation with the moving average wave height value h2, in that the latter also goes up with the rise of the former.

Figure 3:
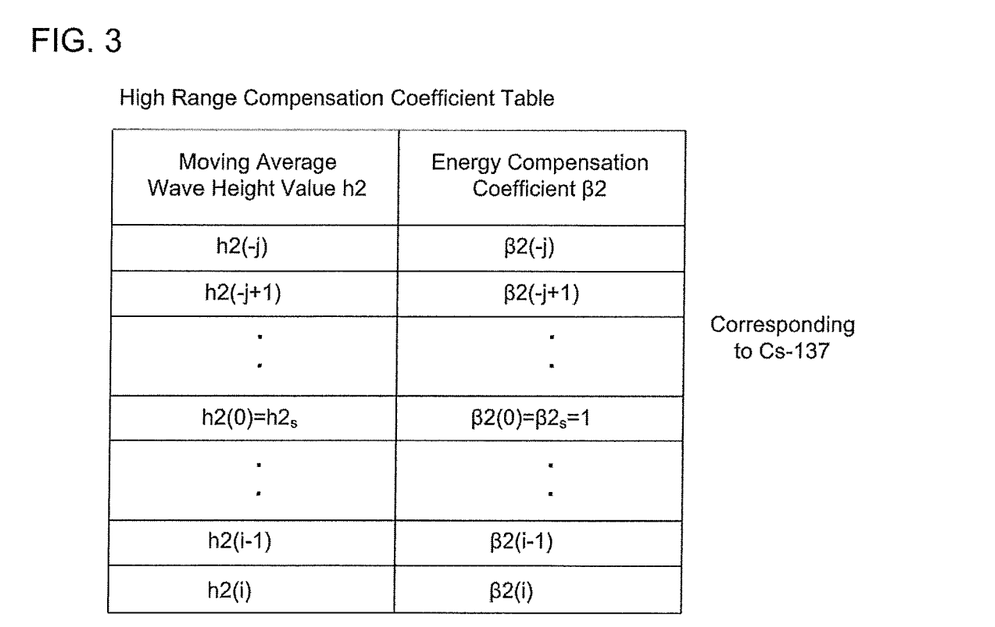
FIG. 3 is a drawing for showing a compensation coefficient table in relation to a high range dose rate.

FIG. 3 is a high range compensation coefficient table (a second compensation coefficient table) for showing the relation between the average wave height value (especially, a moving average wave height value h2) of incident radioactive rays and the energy compensation coefficient ß2 (a second energy compensation coefficient). The high range compensation coefficient table is in memory of an energy compensation coefficient operation part 3243. The energy compensation coefficient operation part 3243 compares a moving average wave height value h2 with the high range compensation coefficient table, and determines and outputs an energy compensation coefficient ß2. The high range dose rate operation part 3242 outputs a high range compensation dose rate DH, which is obtained by multiplying the energy compensation coefficient ß2 with the high range dose rate D2. It should be noted that in the high range compensation coefficient table, a standard energy is defined as the energy of 662 keV γ ray of Cs-137, for example. The energy compensation coefficient ß2 corresponding to the standard energy is set at 1, and energy compensation coefficients ß2 of other energies are shown as the ratio of the standard energy.

In order to create the low range compensation coefficient table, a plurality of energies are selected with respect to the measurement energy range of 50-3000 keV, and radioactive rays are irradiated as a type test. Correction of the dose rate is carried out to grasp the real energy characteristics and to make a moving average wave height value h1 correspond with an energy compensation coefficient ß1. When the type test is difficult to perform at a point due to a high energy, an analytical method can be used to create the low range compensation coefficient table. It should be noted that irradiating with X rays can be used to create the low range compensation coefficient table, when the type test is difficult to perform at a point due to a low energy. A lower limit of 50 keV is set up to measure substantially 81 keV γ rays of Xe-133. Then, it is also allowable to irradiate with 80 keV X rays or 60 keV γ rays (with the effective energy of 57 keV) of Am-241, and assign those results to the energy compensation coefficient ß1 of a compensation lower limit energy. The high range compensation coefficient table is also created in a similar manner.

Figure 4:
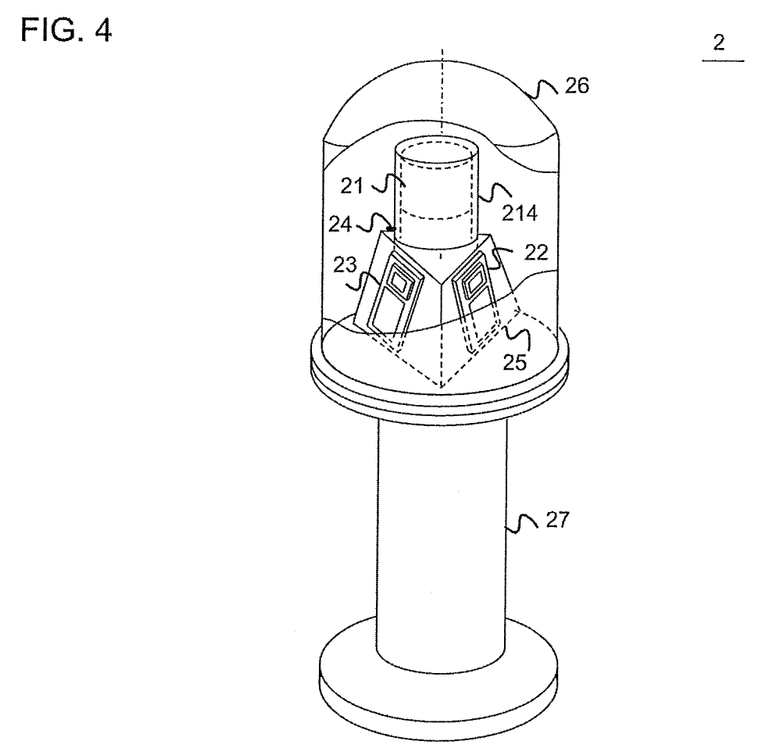
FIG. 4 is a drawing for showing an arrangement of a detecting element section.

The configuration and component arrangement of a detecting element section 2 are explained in reference to FIG. 4. A detecting element section overcoat 26 includes, on the inner side, a scintillation detector 21, semiconductor detectors 22-24, and a mounting base 25, to shade them from lights and shield them electrically. When the detecting element section 2 is installed outdoors, the structure intercepts from the open air and is against water. A stand 27 supports the detecting element section overcoat 26 and the components which are included in the overcoat. In addition, the stand 27 holds the center of a scintillation detector 21 at a predetermined height. The scintillation detector 21 is arranged in the center of the detecting element section 2, and semiconductor detectors 22-24 are attached on the slanting side planes of the mounting base 25. The scintillation detector 21 is built in the inner side of a detector case 214.

The mounting base 25 includes a triangular pyramid which is cut at the upper part thereof and a cave formed inside the triangular pyramid, so that some part of a scintillation detector 21 may be contained in the cave. Each of the semiconductor detectors 22-24 is attached to one of the three slanting side planes of the mounting base 25. The mounting base 25 is arranged in a position, which is out of the predetermined measurement space for the scintillation detector 21. Or in a more concrete word, the mounting base 25 is arranged in a position which does not obstruct the measurement space of the scintillator 211 (refer to FIG. 5A). The central axis of the scintillation detector 21 is a common central axis with a total central axis of each sensor element (refer to FIG. 5B) of the semiconductor detectors 22-24. The semiconductor detectors 22-24 are arranged aslant in a circle, which has a shaft center on the scintillation detector 21. Further, the semiconductor detectors 22-24 are mutually arranged so that each of the detectors is equally spaced.

Figure 5A:
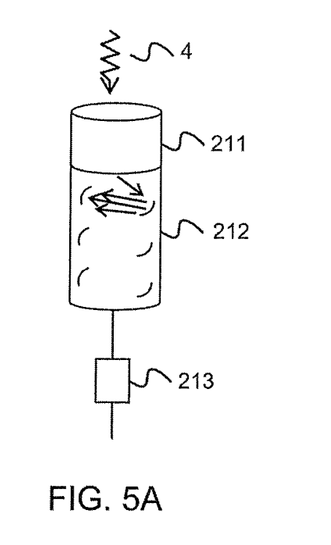
FIG. 5A is a drawing for showing the configuration of a scintillation detector.
Figure 5B:
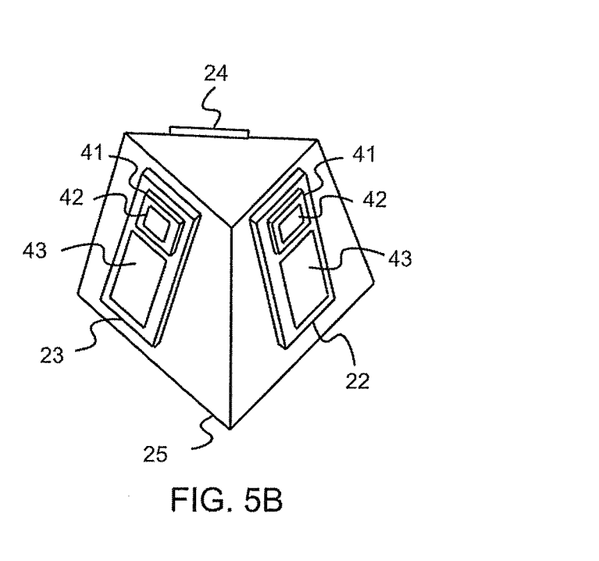
FIG. 5B is a drawing for showing the configuration of semiconductor detectors.

The arrangement of a scintillation detector and semiconductor detectors is explained in reference to FIG. 5A and FIG. 5B. FIG. 5A shows the configuration and the component arrangement of a scintillation detector 21. The scintillation detector 21 is supplied with high voltage from a high voltage power supply 314 (refer to FIG. 1). In the scintillation detector 21, a scintillator 211, a photo multiplier 212, and a preamplifier 213 are arranged in this order. The scintillator 211 absorbs the energy of an incident radioactive ray 4, and yields fluorescence. The photo multiplier 212 converts the fluorescence into an electron, and further multiplies the electron and transforms it into an analog current pulse. The preamplifier 213 converts the analog current pulse into an analog voltage pulse, and outputs it as a first detection signal pulse.

FIG. 5B shows the configuration and the component arrangement of the semiconductor detectors 22-24. Each of the semiconductor detectors 22-24 is provided with a sensor element 41, a filter board 42, and a preamplifier 43. The sensor element 41 detects a radioactive ray and generates an analog current pulse. The filter board 42 is provided on the radioactive ray incident plane of the sensor element 41, and makes energy characteristics flat, so that the number of current pulses per unit time, which are generated per unit dose rate, may not be dependent on the energy of incident radioactive rays. As for the semiconductor detectors 22-24, the sensitivity is made flat roughly, owing to the fact that each sensor element 41 is equipped with a filter board 42 on an incident plane.

The sensor element 41 of the semiconductor detectors 22-24 has energy characteristics, in which the sensitivity (counting rate per unit dose rate) of a single sensor element increases exponentially, as energy becomes lower in a measurement energy region. As a sensor element 41, the Si semiconductor sensor of PIN structure, for example, is easily available and can be applied to the element suitably. The preamplifiers 43 of the semiconductor detectors 22-24 convert the analog current pulse from the sensor element 41 into an analog voltage pulse. The photo multiplier 212 and the preamplifier 213 are contained in the cave of the mounting base 25.

Figure 6:
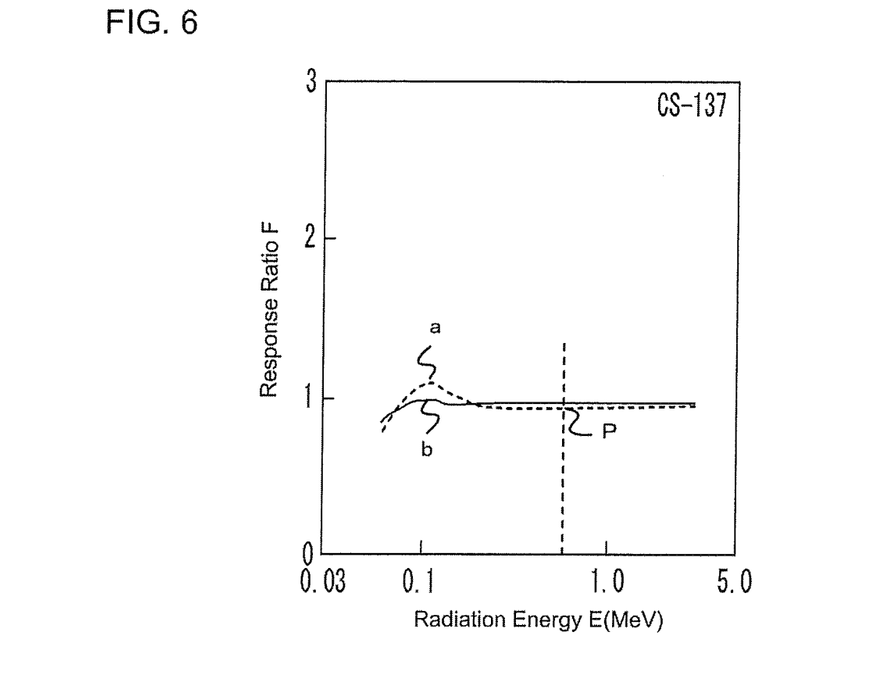
FIG. 6 is a drawing for explaining the energy characteristics at a low range dose rate.

FIG. 6 is a view for illustrating an energy compensation effect on the energy characteristic at a low range dose rate. The horizontal axis shows input energy E (MeV) of a radioactive ray, and the vertical axis shows response ratio F of the dose rate monitoring device 1, where the energy at point P is defined as a standard value. The energy characteristic a shows the energy dependence of the low range dose rate D1 (a first dose rate), where energy compensation is not performed. The energy characteristic b shows the energy dependence of the low range compensation dose rate DL (a first compensation dose rate), where energy compensation is performed. The low range compensation dose rate DL is the result of multiplying an energy compensation coefficient ß1 with a low range dose rate D1. In both cases, a response of the low range dose rate D1 is defined as a standard value of 1, where a γ ray of Cs (Cesium)-137 with energy of 662 keV enters into a scintillator. At other energy levels, response ratios F to the standard value are shown.

The low range dose rate D1 is obtained by corresponding in detail the wave height spectrum with the dose rate, in use of the G (E) function. Accordingly, the energy characteristic a exhibits good dependence on the radiation energy fundamentally. In order to remove the influence of noises, detector signal pulses of less than 50 keV are canceled at the analog to digital conversion part 312, without measuring the values of those pulses. Even if the energy of a radioactive ray which enters into the scintillation detector 21 is in a measurement energy range, a wave height spectrum is distributed below the wave height value, which is equivalent to the energy of the incident radioactive ray. For this reason, as the energy of the incident radioactive ray is closer to the lower limit energy of 50 keV, the rate of cancellation increases and the influence on the low range dose rate D1 can be no longer disregarded.

When the incident radioactive ray is 400 keV or less in energy, the amount of luminescence per given unit energy assumes the shape of a mountain with a maximum of 1.2 times peak. If the influence of pulse cancellation at 50 keV or less and the influence of the increase of the amount of luminescence at the low energy are combined, the energy characteristic a assumes the shape of a small mountain at 100 keV or so, and begins to fall at the lower energy. In order to compensate the distortion left behind on the energy characteristic a, a low range dose rate D1 is multiplied by an energy compensation coefficient ß1. A good energy characteristic like the energy characteristic b is obtained by carrying out energy compensation on the low range dose rate D1 to find a low range compensation dose rate DL (a first compensation dose rate).

Figure 7:
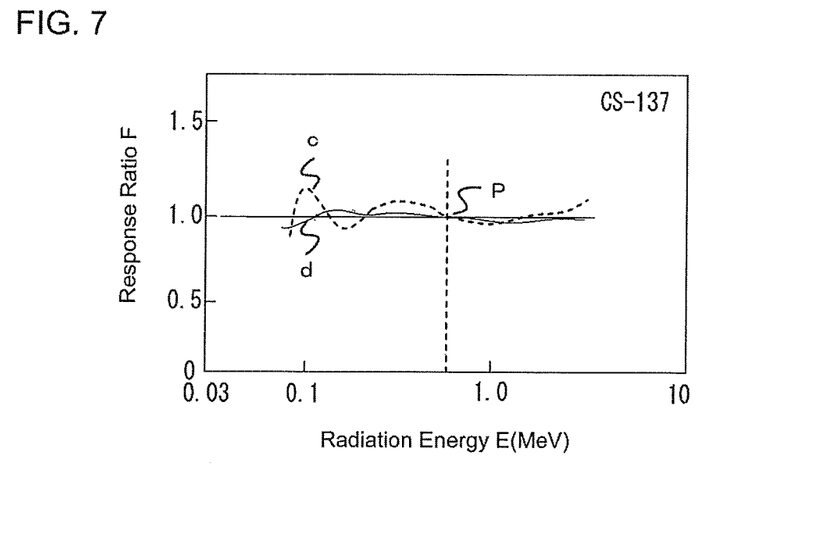
FIG. 7 is a drawing for explaining the energy characteristics at a high range dose rate.

FIG. 7 is a view for illustrating the energy compensation effect on the energy characteristic at a high range dose rate. The energy characteristic c shows the energy dependence of a high range dose rate D2 (a second dose rate), on which the energy compensation is not performed. The energy characteristic d shows the energy dependence of a high range dose rate DL (a first compensation dose rate), on which the energy compensation is performed. The high range dose rate DL after the energy compensation is the result of multiplying an energy compensation coefficient ß2 with a high range dose rate D2. Although the sensitivity, as a counting rate per unit dose rate, can be made roughly flat, through the operation of each filter board 42 which is provided on a radioactive ray incident plane of the sensor elements 41, the sensitivity assumes the shape of a small mountain at the low energy of 100 keV or less, as a compensation limit of the physical filter.

In order to remove the influence of noises in the analog to digital conversion part 323, the detector signal pulses of less than 50 keV are canceled without measuring the values of those pulses. As a result, some valleys are produced at between 100 keV and 200 keV, and the sensitivity begins to fall rapidly at 60 keV or less. In order to compensate the distortion left behind on the energy characteristic, a high range dose rate D2 before the energy compensation is multiplied by an energy compensation coefficient ß2, to find a high range compensation dose rate DH (a second compensation dose rate) after the energy compensation. As a result, a good characteristic like the energy characteristic d is obtained.

The scintillation detector 21 will produce a detection signal pulse with a shorter interval, when the dose rate becomes high. In addition, when the dose rate becomes further higher, the scintillation detector 21 will produce detection signal pulses at a reduced dose rate, due to the influence of the probability in the pileup of detector pulse signals. Although the same is true in the semiconductor detectors 22-24, the dose rate, which is under the influence of the probability in the pileup of detector pulse signals, is shifted to 4 decades or more towards a high dose rate side. If the dose rate is at the same level, the number of analog voltage pulses per unit time outputted from the scintillation detector 21 decreases, as the energy of the incident radioactive ray becomes larger. Furthermore, the saturation by the pileup is shifted to the high dose rate side.

Figure 8:
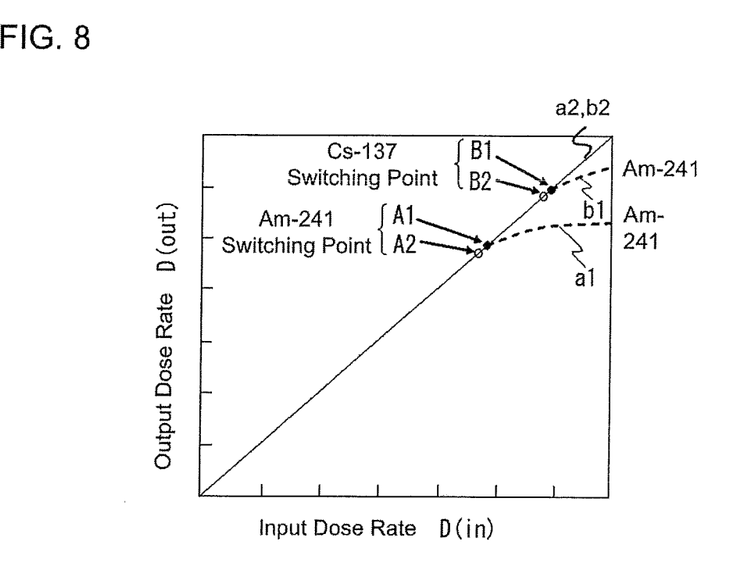
FIG. 8 is a drawing for explaining the switching operation of a dose rate switching section.

FIG. 8 is a view for illustrating the switching operation of a dose rate switching section 33. In the figure, the horizontal axis shows an input dose rate D (in) by the radioactive ray and the vertical axis shows an output dose rate D (out) by the radioactive ray. At both axes, data are denoted by the logarithm scale. The characteristic a1 shows, on a conceptual basis, the input and output response dependence with respect to an effective energy 57 keV of Am (Americium)-241, at the low range dose rate measurement part 31. The low range compensation dose rate DL, which is outputted from the low range dose rate operation part 3133, increases in proportion to the input dose rate D (in), and is saturated following the increase. The characteristic a2 shows, on a conceptual basis, the input and output response dependence with respect to an effective energy 660 keV of Cs (Cesium)-137 at the low range dose rate measurement part 31. The ideal characteristic a2 overlaps and proceeds with the characteristic a1, and then, the characteristic a2 will be saturated at the region where the dose rate is higher than that of the characteristic a1.

The characteristic b1 shows, on a conceptual basis, the input and output response dependence with respect to Am-241 in the high range dose rate measurement part 32. Ideally, the center value of fluctuations of the characteristic b1 overlaps with that of the characteristic a1. The saturation point of the characteristic b1 shifts 4 decades or more to the high dose rate side from that of the characteristic a1, and the characteristic b1 is not saturated within a measurement range. The characteristic b2 shows, on a conceptual basis, the input and output response dependence with respect to Cs-137 in the high range dose rate measurement part 32. Ideally, the center value of fluctuations of the characteristics b2 overlaps with that of the characteristic a2, and the saturation point of the characteristics b2 shifts 4 decades or more to the high dose rate side from that of the characteristic a2, and the characteristics b2 is not saturated within a measurement range. The characteristic b1 and the characteristic b2 overlap ideally within a measurement range.

Here, the field in that ideal overlapping is performed is an ideal case where both energy characteristics are completely in agreement. The characteristic a1, the characteristic a2, the characteristic b1, and the characteristic b2 are shown in the figure as compensated and ideal characteristics. In reality, because some differences may remain in both energy characteristics mutually, some deviations occur from a straight line. Also in the ideal situation where the center value of fluctuations of the high range compensation dose rate DH overlaps with that of the low range compensation dose rate DL, the actual switching between the low range compensation dose rate DL and the high range compensation dose rate DH is performed under the existence of fluctuations of the high range compensation dose rate DH. For this reason, it is desirable to switch the range automatically, by detecting the conditions where fluctuations were reduced, in another word, by detecting a saturation starting point of the low range compensation dose rate DL.

The low range compensation dose rate DL outputted from the low range dose rate operation part 3133 and the high range compensation dose rate DH outputted from the high range dose rate operation part 3242 are inputted into a dose rate switching section 33. The dose rate switching section 33 calculates the ratio of the low range compensation dose rate DL and the high range compensation dose rate DH, and outputs the low range compensation dose rate DL or the high range compensation dose rate DH to the display operating section 34, according to the magnitude of the ratio. At the time of an upward switching, the display range will be switched from a low range compensation dose rate DL to a high range compensation dose rate DH, when the ratio DH/DL becomes 1+k1 or more. At the time of a downward switching, the display range will be switched from the high range compensation dose rate DH to the low range compensation dose rate DL, when the ratio DH/DL becomes 1+k2 or less.

Point A1 and Point A2 show an upward switching point of Am-241, and an downward switching point of Am-241, respectively. Point B1 and Point B2 show an upward switching point of Cs-137, and a downward switching point of Cs-137, respectively. Here, the constant k1 and the constant k2 are positive numbers, and they are set to k1>k2, so that the hunching of the switching operation by fluctuations may be prevented. The constants are set as suitable values, which are found in an experiment so that the level difference accompanied by the switching might be minimized. Positive numbers were selected as the constant k1 and the constant k2, and moreover, switching to the high range compensation dose rate DH is performed, by detecting the saturation of the low range compensation dose rate DL. Accordingly, sure switching can be made also at the time of a rapid upward response.

As mentioned above, the low range dose rate measurement part 31 and the high range dose rate measurement part 32 measure the wave height spectrum and calculate the moving average wave height value, and compensate the energy characteristics of each energy region based on the moving average wave height value, respectively. Therefore, over the whole measurement energy, favorable energy characteristics can be obtained. The low range dose rate measurement part 31 and the high range dose rate measurement part 32 can share the measurements of a low range compensation dose rate DL and a high range compensation dose rate DH, on the basis of the favorable energy characteristics. The dose rate switching section 33 determines a favorable switching point automatically according to the energy of incident radioactive rays, based on the ratio DH/DL, and is formed to switch between the low range compensation dose rate DL and the high range compensation dose rate DH. As a result, a highly precise dose rate monitoring device can be provided which is good in linearity and energy characteristics, over the whole measurement range.

Furthermore, the semiconductor detectors 22-24 are arranged in a position where the detectors do not obstruct the measurement space of the scintillator 211, and moreover, are arranged equally spaced around the central axis of the scintillator 211, so that the noticeable planes of the detectors may look up obliquely upward. As a result, it is prevented that the semiconductor detectors 22-24 may become an obstacle for the scintillator 211 to measure radioactive rays. In addition to that, an effect is realized that the dose rate monitoring device can acquire good direction dependence over the whole measurement range.

Embodiment 2

Figure 9:
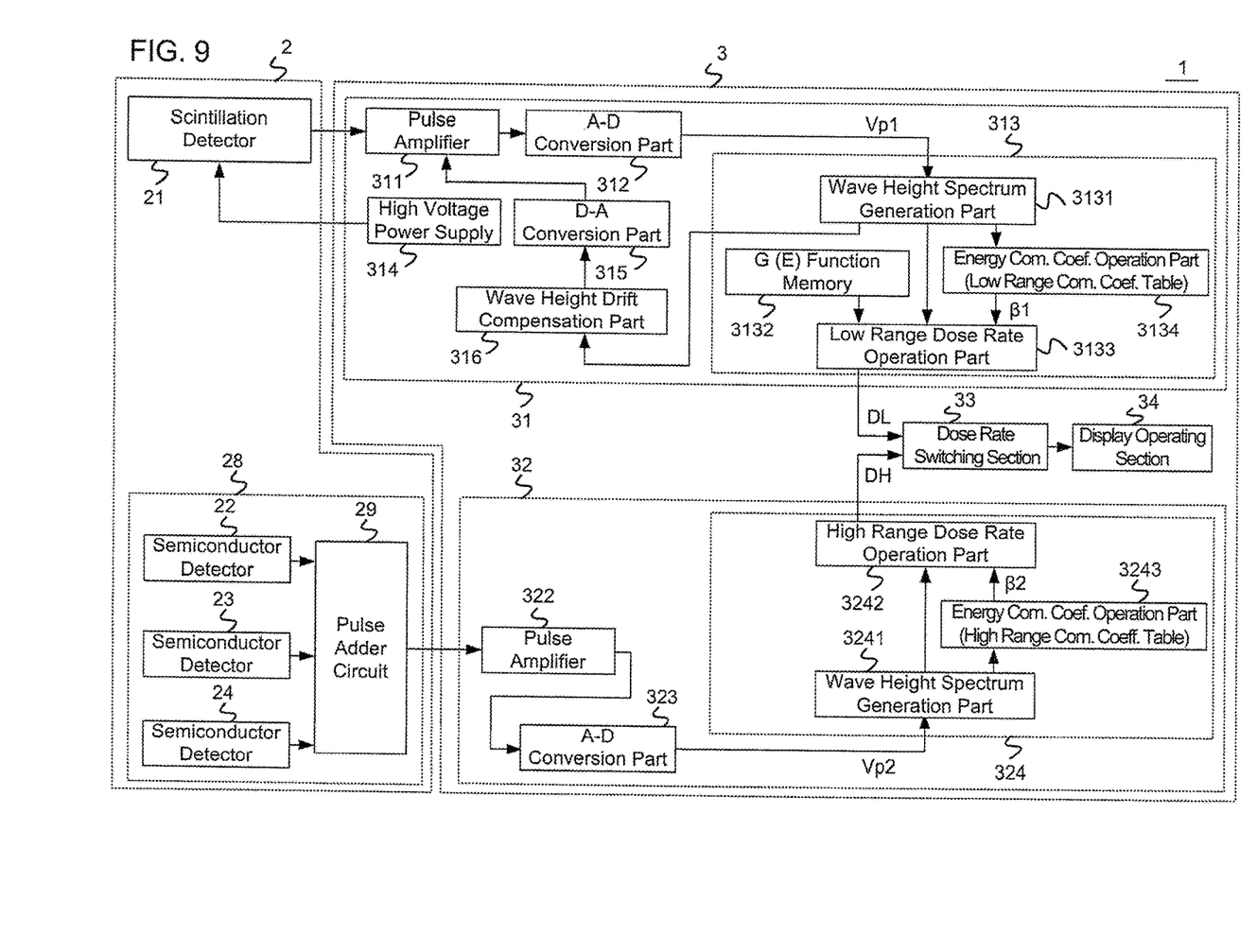
FIG. 9 is a drawing for showing the configuration of a dose rate monitoring device in accordance with Embodiment 2.

According to Embodiment 1, energy compensation coefficients are determined based on the average wave height values of the scintillation detector 21 and the semiconductor detectors 22-24, and then, the response ratio at each energy level is maintained constant. Although the semiconductor detectors 22-24 have stable features on temperature and time in the wave height value, the wave height value of the scintillation detector 21 is temperature dependent and further changes over time. If the wave height value drifts, it will become difficult to maintain the response ratio to be constant. According to Embodiment 2, as shown in FIG. 9, the low range dose rate measurement part 31 is equipped with a digital to analog conversion part 315 (a D/A conversion part) and a wave height drift compensation part 316, as wave height drift compensation means.

Natural radioactive nuclide K-40 is contained in the members of the scintillation detector 21. The wave height spectrum generated by the wave height spectrum generation part 3131 is inputted into the wave height drift compensation part 316. The wave height drift compensation part 316 analyzes a spectral peak position of the natural radioactive nuclide K-40, based on the wave height spectrum, and outputs the compensation data for carrying out automatic compensation of the gain in the pulse amplifier 311, so that the spectral peak position may become a predetermined position. The digital to analog conversion part 315 converts the compensation data into analog signals. The pulse amplifier 311 operates so that the analog signal may control the automatic compensation of the gain. Accordingly, the dose rate monitoring device is capable of measuring radioactive rays, by maintaining the flat energy characteristics stably.

Embodiment 3

Figure 10:
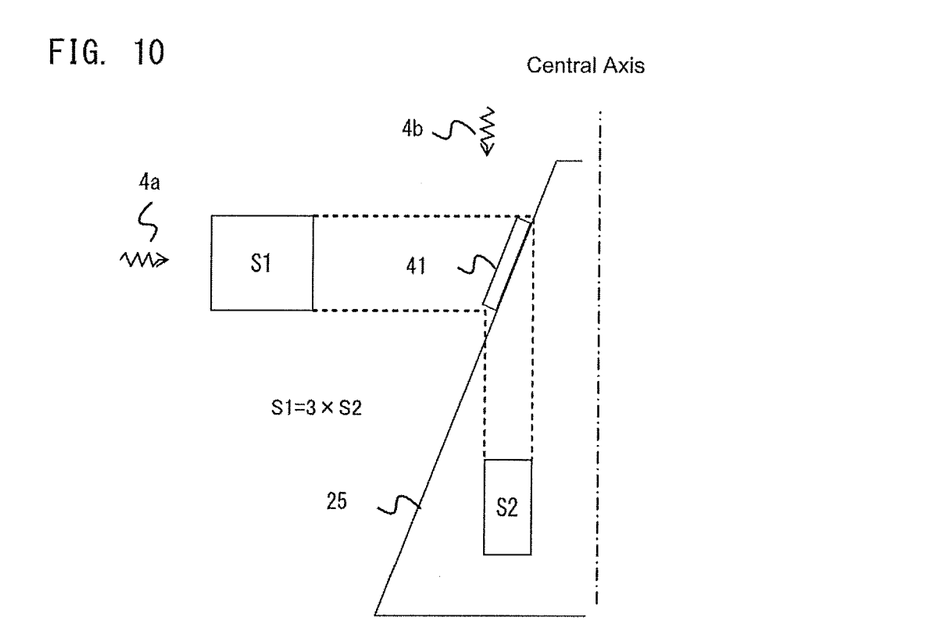
FIG. 10 is a drawing for showing the effective area of a sensor element in accordance with Embodiment 3.

FIG. 10 is a view for expressing the relationship in positions of a mounting base 25 and a sensor element 41, according to Embodiment 3. A radioactive ray 4a denotes a radioactive ray which enters in the direction perpendicular to the central axis of the mounting base 25. A radioactive ray 4b denotes a radioactive ray which enters in the direction parallel to the central axis of the mounting base 25. Among three sensor elements, a single sensor element sits towards the incident direction of the radioactive ray. The perspective view area S1 (equivalent to an effective area) of this single sensor element works effectively to the radioactive ray 4a which enters horizontally. To the radioactive ray 4b which enters in the perpendicular direction, each perspective view area S2 (equivalent to an effective area) of the three sensor elements works effectively. For this reason, the semiconductor detectors 22-24 (and a sensor element 41) are arranged on the mounting base 25, aslant with respect to the direction of a ceiling, so that the perspective view area S2 to the perpendicular direction and the perspective view area S1 to the horizontal direction may become equal. It should be noted that a favorable inclination to the detection central axis of the semiconductor detectors 22-24 can be obtained in an experiment. The direction dependence of the detectors can be reduced, if fine adjustments of the inclination are carried out to the semiconductor detectors.

The semiconductor detectors 22-24 are arranged in a position where the detectors do not obstruct the measurement space of the scintillator 211, and moreover, are arranged equally spaced around the central axis of the scintillator 211, so that the noticeable planes of the detectors may look up obliquely upward. Further, each sensor element of the semiconductor detectors 22-24 is arranged, so that the effective area to the direction of a ceiling and the effective area to the rectilinear direction which penetrates through the surface center of the sensor element and crosses at a right angle with the central axis of the scintillator 211 may become equal. As a result, it is prevented that the semiconductor detectors 22-24 may become an obstacle for the scintillator 211 to measure radioactive rays. In addition to that, an effect is realized that the dose rate monitoring device can acquire good direction dependence over the whole measurement range.

Embodiment 4

Figure 11:
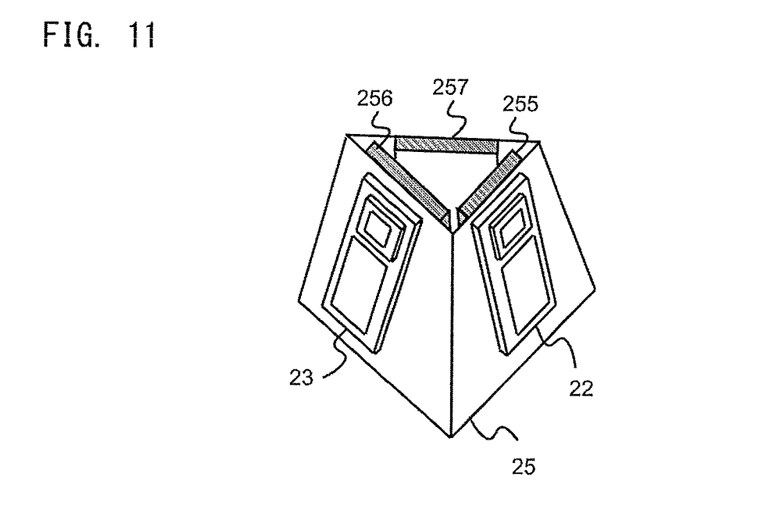
FIG. 11 is a drawing for showing the configuration of a mounting base in accordance with Embodiment 4.

According to Embodiment 1, it is probable that, when an incident radioactive ray is with high energy, the radioactive ray penetrates through a semiconductor detector, and enters also into another semiconductor detector from its back side, and both semiconductor detectors may detect the radioactive ray. According to Embodiment 4, as shown in FIG. 11, a shield object 255 is arranged on the back side of the semiconductor detector 22, a shield object 256 is arranged on the back side of the semiconductor detector 23, and a shield object 257 is arranged on the back side of the semiconductor detector 24. The shield objects 255-257 are provided on the inner planes of the mounting base 25 and then, the incidence of radioactive rays from the back side of a semiconductor detector is reduced. Compared with Embodiment 1, an average wave height value can be measured with more sufficient accuracy.

Embodiment 5

Figure 12:
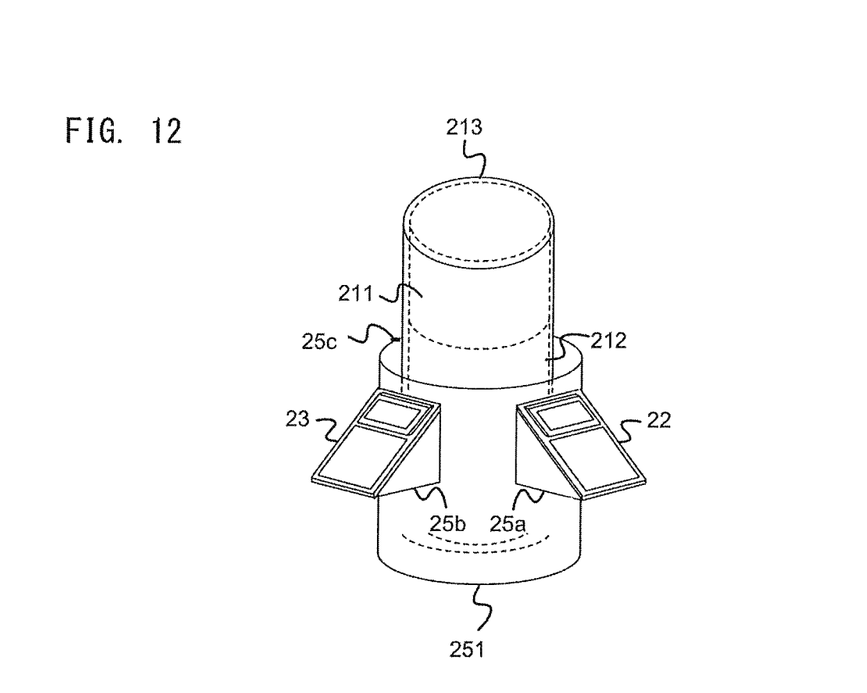
FIG. 12 is a drawing for showing the configuration of a mounting base in accordance with Embodiment 5.

According to Embodiment 1, employed is a mounting base 25 which includes a triangular pyramid which is cut at the upper part thereof and a cave which is formed inside the triangular pyramid, so that some part of the scintillation detector 21 (a photo multiplier 212 and a preamplifier 213) may be contained in the cave. The semiconductor detectors 22, 23, and 24 were attached on the slanting sides of the mounting base 25. According to Embodiment 5, pedestals 25a, 25b, and 25c, which have a slanting plane to a ceiling, are attached to the cylinder part 251 of the mounting base 25, as shown in FIG. 12. The semiconductor detectors 22, 23, and 24 were arranged at an inclined plane so that the effective area of a sensor element might become the same as that of Embodiment 3. Accordingly, an effect is realized that the processing cost of the mounting base 25 can be reduced.

Embodiment 6

Figure 13:
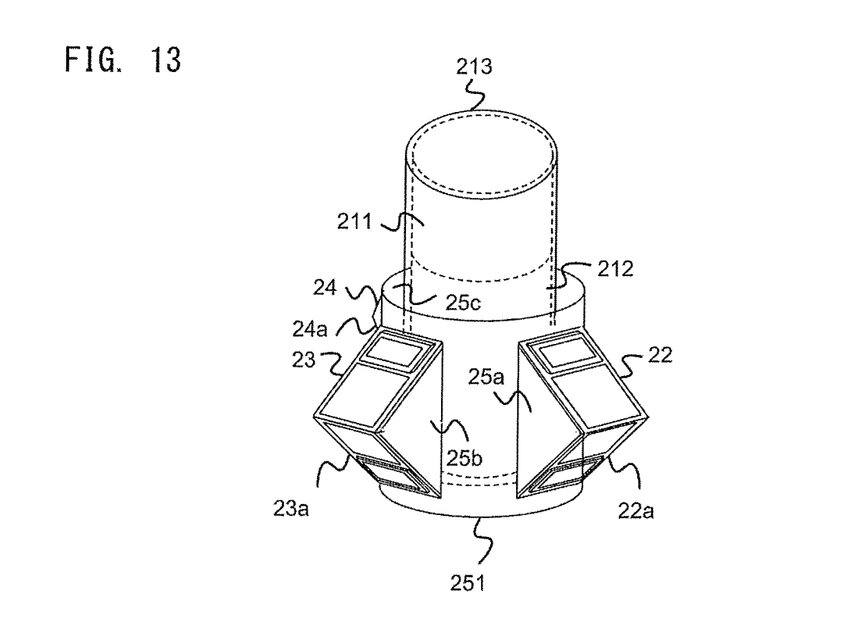
FIG. 13 is a drawing for showing the configuration of a mounting base in accordance with Embodiment 6.

According to Embodiment 5, the semiconductor detectors 22-24 are installed on the pedestals 25a-25c, with turning their faces obliquely upward to detect radioactive rays from various oriented directions. In Embodiment 6, as shown in FIG. 13, the pedestals 25a, 25b, and 25c are attached to the cylinder part 251. A semiconductor detector 22 and a semiconductor detector 22a are attached to the pedestal 25a. A semiconductor detector 23 and a semiconductor detector 23a are attached to the pedestal 25b. A semiconductor detector 24 and a semiconductor detector 24a are attached to the pedestal 25c. The semiconductor detectors 22a, 23a, and 24a have been arranged on each of the lower planes of the pedestals, so that the semiconductor detectors 22a, 23a, and 24a may become respectively plane symmetry to the semiconductor detectors 22, 23, and 24, which are arranged on each of the upper planes of the pedestals. An effect is realized that the dose rate monitoring device can measure with equal sensitivity, not only radioactive rays from the space around, but also radioactive rays from the radioactive nuclides which are contained in rainfall or snowfall, and arrives at the surface of the earth to be accumulated.

It should be noted that each embodiment of the present invention may be freely combined, or appropriately modified or omitted within the spirit and scope of the invention.

EXPLANATION OF NUMERALS AND SYMBOLS

1 Dose Rate Monitoring Device; 2 Detecting Element Section; 21 Scintillation Detector; 211 Scintillator; 212 Photo Multiplier; 213 Preamplifier; 214 Detector Case; 22 Semiconductor Detector; 22a Semiconductor Detector; 23 Semiconductor Detector; 24 Semiconductor Detector; 24a Semiconductor Detector; 25 Mounting Base; 251 Cylinder Part; 25a Pedestal; 25b Pedestal; 25c Pedestal; 255 Shield Object; 256 Shield Object; 257 Shield Object; 26 Detecting Element Section Overcoat; 27 Stand; 28 Radiation Detection Unit; 29 Pulse Adder Circuit; 3 Measurement Section; 31 Low Range Dose Rate Measurement Part (a First Dose Rate Measuring Means); 311 Pulse Amplifier; 312 Analog To Digital Conversion Part; 313 Low Range Operation Part; 3131 Wave Height Spectrum Generation Part; 3132 G (E) Function Memory; 3133 Low Range Dose Rate Operation Part; 3134 Energy Compensation Coefficient Operation Part; 316 Wave Height Drift Compensation Part; 314 High Voltage Power Supply; 315 Digital To Analog Conversion Part; 32 High Range Dose Rate Measurement Part (a Second Dose Rate Measuring Means); 322 Pulse Amplifier; 323 Analog To Digital Conversion Part; 324 High Range Operation Part; 3241 Wave Height Spectrum Generation Part; 3242 High Range Dose Rate Operation Part; 3243 Energy Compensation Coefficient Operation Part; 33 Dose Rate Switching Section; 34 Display Operating Section; 4 Radioactive Ray; 4a Radioactive Ray; 4b Radioactive Ray; 41 Sensor Element; 42 Filter Board; 43 Preamplifier; DL Low Range Compensation Dose Rate; DH High Range Compensation Dose Rate; D1 Low Range Dose Rate (a first dose rate); D2 High Range Dose Rate (a second dose rate); Vp1 Wave Height Value; Vp2 Wave Height Value; Gi Dose Rate; Ni Countable Value; Hi Wave Height Value; h1 Moving Average Wave Height Value; h2 Moving Average Wave Height Value; D (in) Input Dose Rate; D (out) Output Dose Rate; F Response Ratio; a Energy Characteristic; b Energy Characteristic; c Energy Characteristic; d Energy Characteristic; a1 Characteristic; a2 Characteristic; b1 Characteristic; b2 Characteristic; A1 Point; A2 Point; B1 Point; B2 Point; k1 Constant; k2 Constant; S1 Perspective View Area; S2 Perspective View Area.

What is claimed is:
1. A dose rate monitoring device comprising:
a radiation detector outputting an analog voltage pulse upon absorption of an incident radioactive ray;
a first pulse amplifier amplifying the analog voltage pulse which the radiation detector outputs;
a first analog to digital conversion part converting an output of the first pulse amplifier into a digital signal, wherein the dose rate monitoring device is configured to:
generate a first wave height spectrum of the incident radioactive ray from the output of the first analog to digital conversion part,
obtain a first energy compensation coefficient to the incident radioactive ray using a first compensation coefficient table which shows a relation between an average wave height value and an energy compensation coefficient responsive to generating the first wave height spectrum,
obtain a first dose rate of the incident radioactive ray using a G (E) function table responsive to generating the first wave height spectrum, and
calculate a first compensation dose rate of the incident radioactive ray using the obtained first dose rate and the first energy compensation coefficient;
a radiation detection unit outputting an analog voltage pulse upon absorption of an incident radioactive ray;
a second pulse amplifier amplifying the analog voltage pulse which the radiation detection unit outputs;
a second analog to digital conversion part converting an output of the second pulse amplifier into a digital signal, wherein the dose rate monitoring device is configured to:
generate a second wave height spectrum of the incident radioactive ray from an output of the second analog to digital conversion part,
obtain a second energy compensation coefficient to the incident radioactive ray using a second compensation coefficient table which shows a relation between an average wave height value and an energy compensation coefficient responsive to generating the second wave height spectrum, obtain a second dose rate of the incident radioactive ray responsive to generating the second wave height spectrum, calculate a second compensation dose rate of the incident radioactive ray using the obtained second dose rate and the second energy compensation coefficient, calculate a ratio of the first compensation dose rate to the second compensation dose rate, and output the first compensation dose rate or the second compensation dose rate according to the magnitude of the calculated ratio; and a display operating section displaying the output first compensation dose rate or the output second compensation dose rate.

2. The dose rate monitoring device as set forth in claim 1, further comprising;

a wave height drift compensation part which analyzes the spectral peak position of nuclide K-40 based on the generated first wave height spectrum and creates compensation data with respect to the gain of the first pulse amplifier; and a digital to analog conversion part which converts output of the wave height drift compensation part into an analog signal;

wherein the gain of the first pulse amplifier is automatically compensated based on the output of the digital to analog conversion part.

3. The dose rate monitoring device as set forth in claim 1, wherein the radiation detector comprises a scintillation detector which includes a scintillator, a photo multiplier, and a preamplifier.

4. The dose rate monitoring device as set forth in claim 1, wherein the radiation detection unit comprises a plurality of semiconductor detectors, and a pulse adder circuit which receives an output of the plurality of semiconductor detectors.

5. The dose rate monitoring device as set forth in claim 4, wherein each of the plurality of semiconductor detectors contains a sensor element, a filter, and a preamplifier.

6. The dose rate monitoring device as set forth in claim 4, wherein each of the plurality of semiconductor detectors is arranged in an arrangement where a first perspective view area of a respective semiconductor detector to a perpendicular direction is equal to a second perspective view area of the respective semiconductor detector to a horizontal direction.

7. The dose rate monitoring device as set forth in claim 4, wherein a shield object of the incident radioactive ray is arranged on a back side of at least one semiconductor detector of the plurality of semiconductor detectors.

8. The dose rate monitoring device as set forth in claim 4, wherein the plurality of semiconductor detectors are arranged in an arrangement aslant in a circle, a center of which is arranged at the center of the radiation detector.

9. The dose rate monitoring device as set forth in claim 4, wherein the plurality of semiconductor detectors are arranged in an arrangement in an upper position and a lower position, so that an upper positioned semiconductor is plane symmetry arranged with a lower positioned semiconductor detector.

* * * * *